US010526806B2

(12) United States Patent
McFarland

(10) Patent No.: US 10,526,806 B2
(45) Date of Patent: Jan. 7, 2020

(54) WAVE MAKING APPARATUS

(71) Applicant: American Wave Machines, inc., Solana Beach, CA (US)

(72) Inventor: Bruce McFarland, Solana Beach, CA (US)

(73) Assignee: American Wave Machines, Inc., Solana Beach, CA (US)

( * ) Notice: Subject to any disclaimer, the term of this patent is extended or adjusted under 35 U.S.C. 154(b) by 0 days.

(21) Appl. No.: 16/218,223

(22) Filed: Dec. 12, 2018

(65) Prior Publication Data

US 2019/0194963 A1 Jun. 27, 2019

Related U.S. Application Data

(60) Provisional application No. 62/609,254, filed on Dec. 21, 2017.

(51) Int. Cl.
*E04H 4/00* (2006.01)
*A63G 31/00* (2006.01)
*A63B 69/12* (2006.01)

(52) U.S. Cl.
CPC ........ *E04H 4/0006* (2013.01); *A63B 69/125* (2013.01); *A63G 31/007* (2013.01)

(58) Field of Classification Search
CPC ........................... E04H 4/0006; A63B 69/125
USPC ................................ 405/79; 4/491; 472/128
See application file for complete search history.

(56) References Cited

U.S. PATENT DOCUMENTS

| | | | | |
|---|---|---|---|---|
| 3,473,334 A | * | 10/1969 | Dexter | E04H 4/0006 4/491 |
| 3,629,877 A | * | 12/1971 | Schuster | E04H 4/0006 4/491 |
| 4,539,719 A | * | 9/1985 | Schuster | E04H 4/0006 4/491 |
| 4,561,133 A | * | 12/1985 | Laing | A63B 69/125 4/491 |
| 4,665,572 A | * | 5/1987 | Davidson | A61H 33/0091 4/491 |

(Continued)

FOREIGN PATENT DOCUMENTS

| | | | | |
|---|---|---|---|---|
| CA | 2951754 A1 | * | 7/2017 | ........... A63B 69/125 |
| EP | 343510 A1 | * | 11/1989 | |

(Continued)

OTHER PUBLICATIONS

International Search Report for PCT/US18/65259 dated Mar. 15, 2019.

*Primary Examiner* — Frederick L Lagman
(74) *Attorney, Agent, or Firm* — Manuel de la Cerra

(57) ABSTRACT

A wave making apparatus for use with a wave pool having water is disclosed. The apparatus includes a wave making chamber having an interior and a plurality of chamber walls. The chamber also has a passageway connecting the interior to the wave pool and constructed to allow water to flow there-between. A water vane is disposed of in or adjacent to the passageway. The wave vane includes at least one smooth and curved water vane wall, which in combination with the plurality of chamber walls, create at least two conduit paths for the water flowing between the interior and the wave pool. The conduit paths have two ends, and the water enters one end in a first direction and exits the second end in a second direction.

22 Claims, 10 Drawing Sheets

(56) References Cited

U.S. PATENT DOCUMENTS

| | | | | |
|---|---|---|---|---|
| 4,730,355 A * | 3/1988 | Kreinbihl | E04H 4/0006 | 137/872 |
| 4,979,243 A * | 12/1990 | Teratsuji | A63B 69/125 | 4/488 |
| 4,979,244 A * | 12/1990 | Bastenhof | E04H 4/0006 | 137/875 |
| 5,005,228 A | 4/1991 | Mermelstein | | |
| 5,054,134 A | 10/1991 | Teratsuji | | |
| 5,306,219 A | 4/1994 | Solymosi | | |
| 6,241,422 B1 * | 6/2001 | Makowski | E04H 4/0006 | 4/491 |
| 6,336,771 B1 * | 1/2002 | Hill | A63G 31/007 | 405/79 |
| 6,611,970 B2 * | 9/2003 | Back | A47K 3/10 | 4/491 |
| 6,729,799 B1 * | 5/2004 | Raike | E04H 4/0006 | 4/491 |
| 7,537,414 B1 * | 5/2009 | Raike | E04H 4/0006 | 4/491 |
| 7,815,396 B2 * | 10/2010 | McFarland | E04H 4/0006 | 4/491 |
| 8,303,213 B2 * | 11/2012 | McFarland | E02B 3/02 | 405/79 |
| 8,496,403 B2 * | 7/2013 | Lochtefeld | E04H 4/0006 | 4/491 |
| 2006/0115329 A1 | 6/2006 | Johnson | | |
| 2007/0039092 A1 * | 2/2007 | Murdock | A63B 69/125 | 4/496 |
| 2008/0016610 A1 * | 1/2008 | Kuo | A63B 69/125 | 4/488 |
| 2008/0089744 A1 * | 4/2008 | McFarland | A63B 69/125 | 405/79 |
| 2010/0124460 A1 * | 5/2010 | Fricano | A63B 69/0093 | 405/79 |
| 2011/0110775 A1 * | 5/2011 | Gillette | A63B 69/125 | 415/211.2 |

FOREIGN PATENT DOCUMENTS

| | | | | |
|---|---|---|---|---|
| GB | 2149063 A * | 6/1985 | | A47K 3/10 |
| WO | 2009/070036 | 6/2009 | | |

\* cited by examiner

WAVE MAKING APPARATUS

RELATED APPLICATIONS

This application further claims priority as the non-provisional of U.S. Provisional Application No. 62/609,254 filed Dec. 21, 2017 titled "Wave Making Apparatus", the entire contents of which is hereby incorporated by reference.

TECHNICAL FIELD

The present application relates to wave generators, such as, wave generators for making waves in pools for recreational purposes.

BACKGROUND

Wave making apparatuses are often used for recreational purposes. They create one or more waves in a pool or the like, and people typically either play in the waves or use the waves for aquatic sports such as board sports. Aquatic board sports, such as surfing and bodyboarding, require that the waves be rideable. Enthusiasts in these types of sports often use wave making apparatuses for competition, practice and entertainment.

Once such example of a wave making apparatus is disclosed in U.S. Pat. No. 7,815,396. FIG. 6 is a simplified side view of the wave making apparatus 5 disclosed in the '396 Patent. The apparatus 5 has a wave pool 10 with a bottom 12. At one end of the wave pool 10 is a wave making chamber 15 that pushes or releases water into the wave pool 10, creating a wave. The chamber is designed to receive and release water from the pool 10 through the passageway 17 (shown by arrow 18), lifting and lowering the water level in the chamber 15 (shown by arrow 19), and to thereby create a wave within the pool 10. In this design, the passageway 17 to the pool 10 is submerged within the pool water.

A major drawback to this design is that the release of the water through the passageway 17 will generate eddy currents that interfere with the stability and rideability of the wave. This is shown in FIG. 7A-7H. These figure show one cycle. FIG. 7A is the start of water release from the wave generating chamber into the wave pool, and a high velocity eddy 60 begins to form. In FIG. 7B, moments later, the eddy 65 is moving through the passageway 17 into the wave pool 10, and a rideable wave 67 begins to form. FIG. 7C, still moments later, shows that the high velocity eddy 70 continues in the wave pool 10, and by FIG. 7D clear eddies 75 have formed that affect the wave pool surface, shown by an eddy-induced pool surface depression 76. It should be noted that the wave 72 shown in FIG. 7C is not well-formed, and this is because the eddies 70, 76 are drawing water away from the wave front and eroding the wave formation. FIGS. 7E through 7H show the eddies 80, 85, 90 and 95, which are causing a significant disruption to the wave pool surface, shown by eddy-induced pool surface depressions 82, 87, 92 and 97. Not only do the eddies erode wave formation, but they require that the operator delay actuating the wave making chamber for a subsequent wave formation until the water is sufficiently placid. Otherwise, the wave surface disruptions would further erode the rideable wave.

What is needed, therefore, is a way to mitigate the eddy currents to promote a stable and rideable wave, in an apparatus that can quickly reset and produce subsequent waves.

SUMMARY

A wave making apparatus for use with a wave pool having water is disclosed. The apparatus includes a wave making chamber having an interior and a plurality of chamber walls. The chamber also has a passageway connecting the chamber interior to the wave pool and constructed to allow water to flow there-between. A water vane is disposed of in or adjacent to the passageway. The wave vane includes at least one smooth and curved water vane wall, which in combination with the plurality of chamber walls, creates at least two conduit paths for the water flowing between the interior to the wave pool. The conduit paths have two ends, and the water enters one end in a first direction and exits the second end in a second direction.

The curved wall may have a curve sweep in the range of 45 and 120 degrees. The water vane wall may be curved-planar. There may be more than one curved wall resulting in more than two conduit paths. A cross member may be used to connect the vane walls. The water vane may extend from the interior of the wave making chamber to the wave pool. The water vane may be constructed of multiple parts.

The water vane may have a bracket adapted to mount the water vane to at least one of the plurality of chamber walls. When mounted, the water vane position can be adjusted relative to the at least one chamber wall, in a rotational or translational adjustment.

The water main may be used as an improvement in an existing wave making apparatus.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Figure 1:
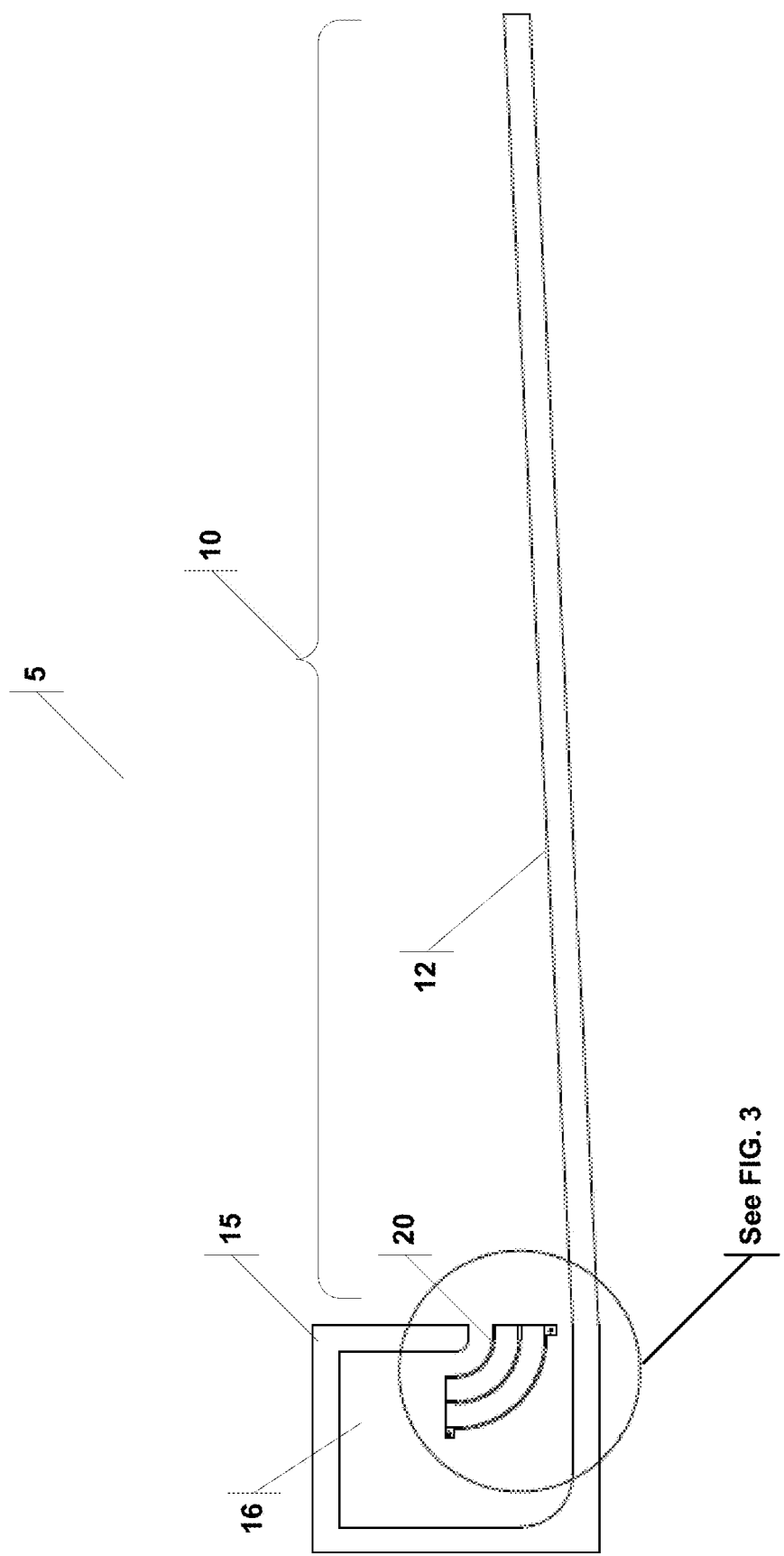
FIG. 1 is a side view of a wave making apparatus, with a novel water vane.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-7G and is provided for ease of reference, where like reference numerals designate corresponding features throughout the specification and figures:

Wave making apparatus 5
Wave pool 10
Pool bottom 12
Wave making chamber 15
Chamber wall 15A
Chamber bottom wall 15B
Chamber interior 16
Chamber passageway 17
Water push and pull direction through passageway 17
Lifting and lowering of the water level in the chamber 19
Water vane (curved-planar) 20
Water vane (segmented-curved) 20A
Pump housing 21
Pump 22
Water vane walls 25
Conduit paths 30, 35, 40, 45
Water vane mounting bracket 50
Water vane cross members 55
Rotatable axis 56
Rotational adjustment 56A
First threaded shaft 57
First translational movement direction 57A
Second threaded shaft 58
Second translational movement direction 58A
Small straight sections in successive angles 61A, 61B, 61C, 61D
Wave 67, 72
Eddies 60, 65, 75, 80, 85, 90, 95
Eddy-induce pool surface depression 76, 82, 87, 92, 97
Wave pool stepped bottom 102
Rideable wave 110, 120, 130,
Deep eddies 105, 115, 125, 135, 145
Still wave pool surface 140, 150

FIG. 1 is a side view of a wave making apparatus 5, such as the one disclosed in U.S. Pat. No. 7,815,396. The apparatus 5 has a wave pool 10 with a bottom 12. At one end of the wave pool 10 is a wave making chamber 15 that pushes water into the wave pool 10, creating a rideable wave. Water flows between the wave pool 10 and the interior 16 of the wave making chamber 15 through a chamber passageway 17 this at least partially submerged in the pool water.

To mitigate the eddy currents and to promote a stable and rideable wave in an apparatus that can quickly reset and produce subsequent waves, a water vane 20 is disposed of in or adjacent to the chamber passageway 17. The water vane 20 defines a smoother path for the water that is released from the wave making chamber 15. As shown in the subsequent figures, the water vane 20 mitigates eddy currents that erode the formation of the rideable waves. It also mitigates the turbulence at the surface of the wave pool, such that waves can be generated more rapidly without having to wait for the wave pool to become placid between waves.

Figure 2:
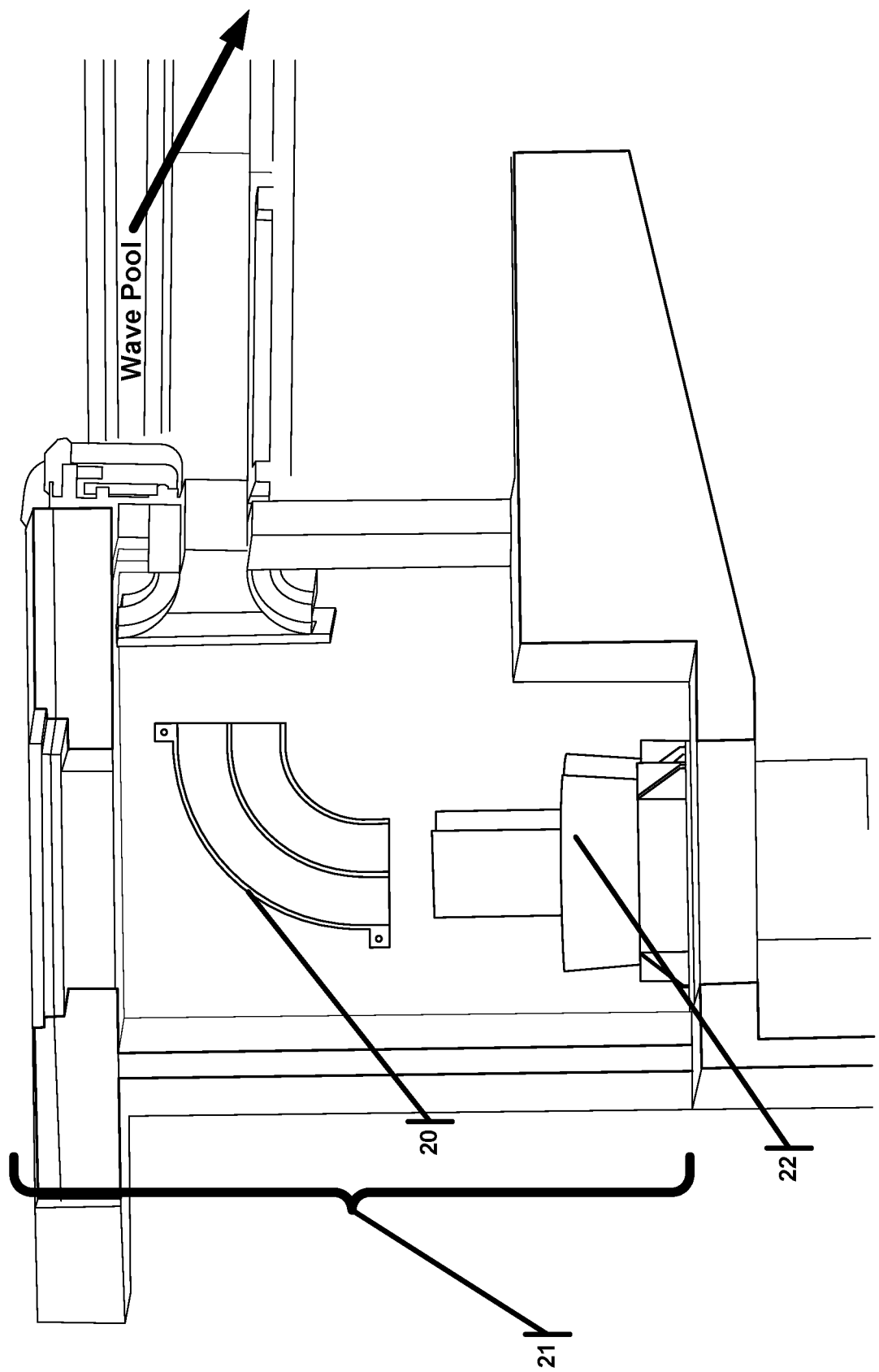
FIG. 2 is a side view of the pump housing of a wave making apparatus, with a novel water vane.

FIG. 2 is a side view of the pump housing 21 of a wave making apparatus, such as the one disclosed in U.S. Pat. No. 8,303,213. Water that is pumped by pump 22 is turned by the water vane before being introduced into the wave pool. The apparatus of FIG. 2 is different than that of FIG. 1 in that there is no submerged chamber passageway to the wave pool (note the wave pool is not shown in FIG. 2). Instead, the water is released into the wave pool at a higher elevation.

Figure 3A:
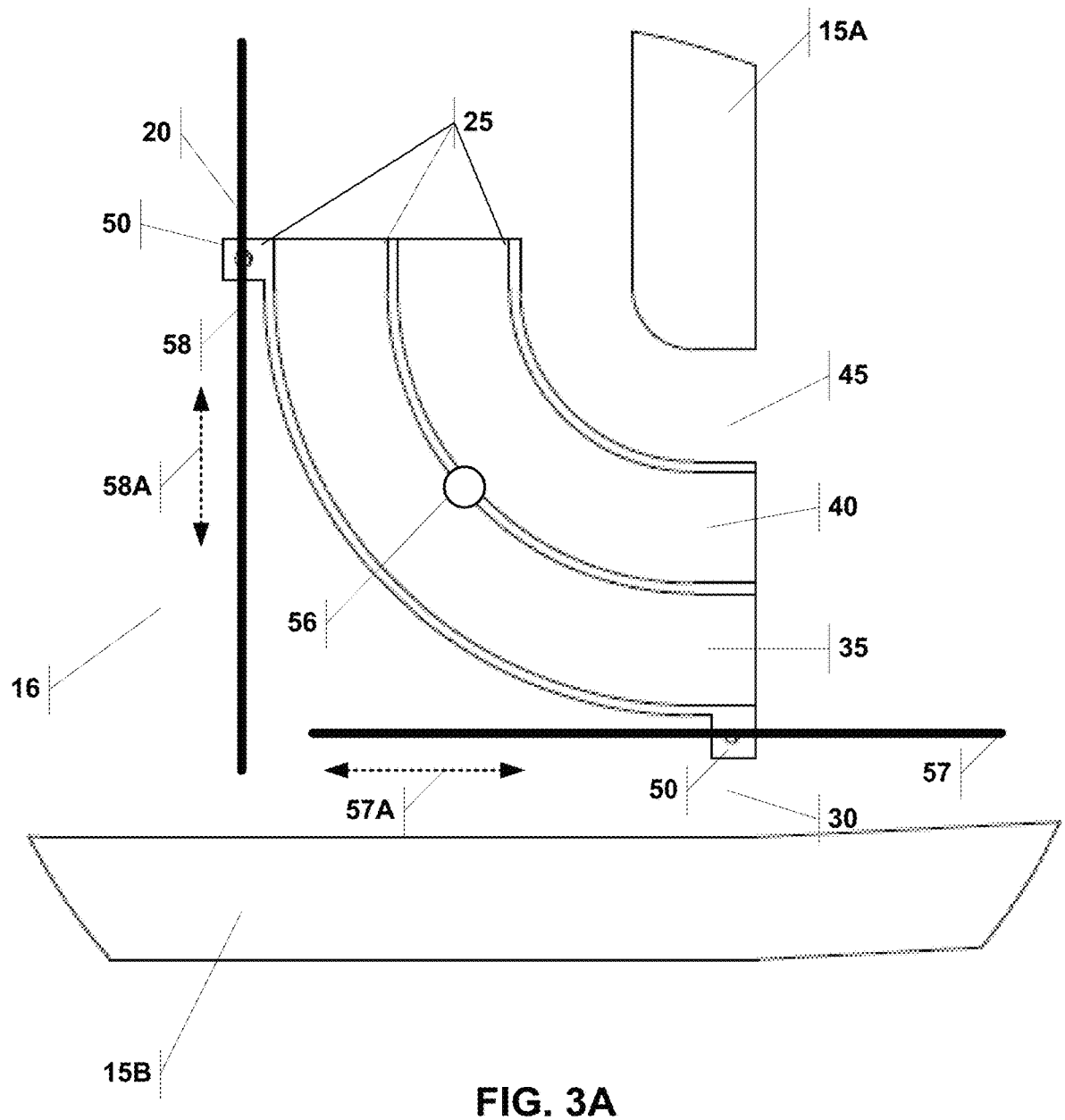
FIG. 3A is an enlarged view of a portion of FIG. 3.

FIG. 3A is an enlarged view of a portion of FIG. 1 showing the water vane 20 in more detail. The wave making chamber 15 has a plurality of walls (side wall 15A and bottom wall 15B) and a side wall that is in the plane of the figure. The water vane has mounting brackets 50 that allow the water vane 20 to be mounted to the wall or walls of the wave making chamber. Alternatively, the water vane 20 can be mounted to an axis 56 that allows the water vane 20 to be adjusted (see arrows 56A) relative to the chamber walls during the operation of the wave making chamber. This adjustability may be advantageous to fine-tune eddy formation mitigation. Although the adjustability is shown as rotational, it may also be translational. For example, the water vane may be mounted to a first threaded shaft 57 that moves the water vane parallel to the chamber bottom wall 15B (arrow 57A) and a second threaded shaft 58 that moves the water vane 20 parallel to side wall 15A (arrow 58A).

Figure 4:
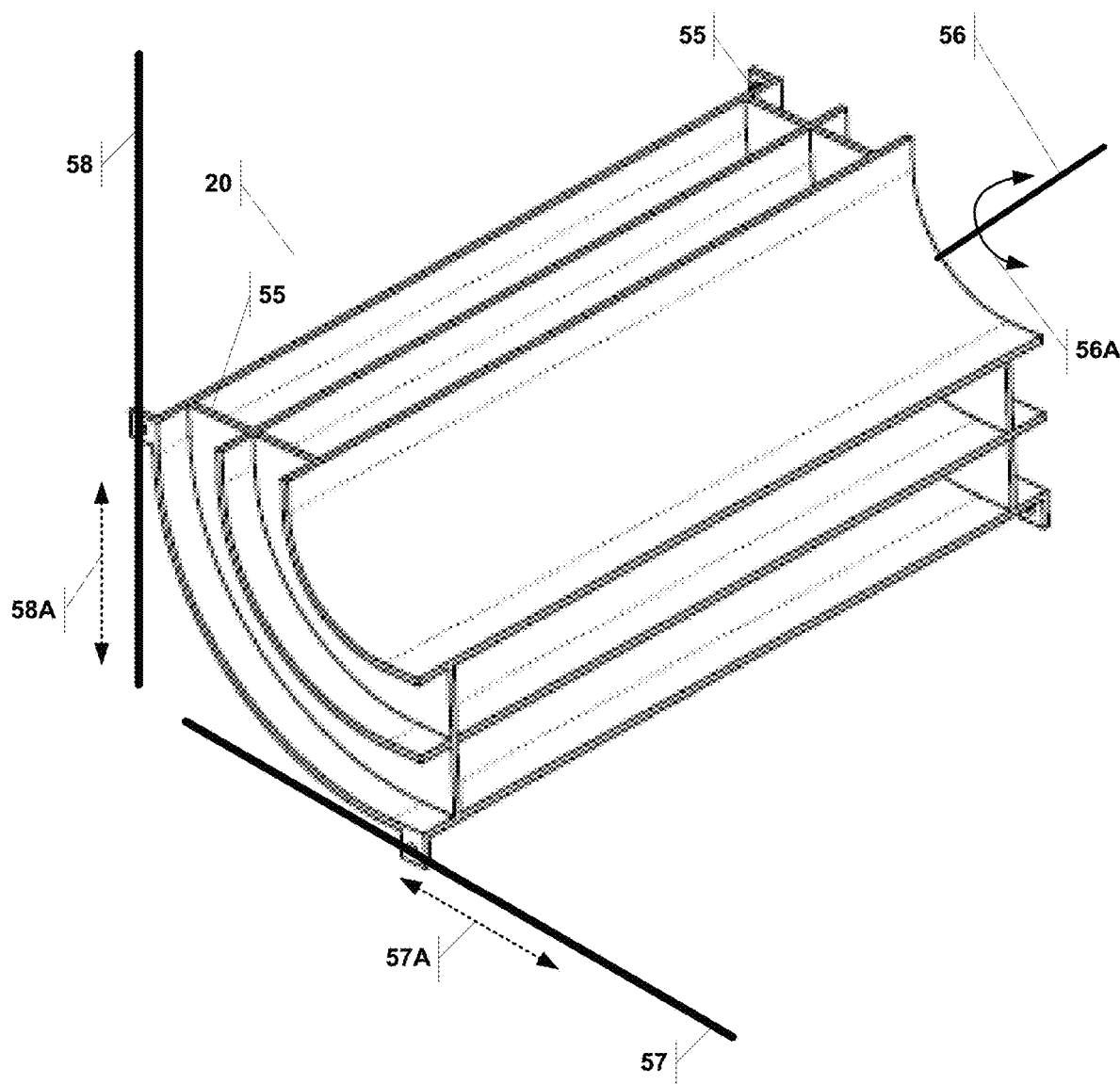
FIG. 4 is an isometric view of a water vane from FIG. 3A.

The water vane 20 shown has three smooth vane walls 25 that, when disposed in the passageway 17 between the wave making chamber 15 and the wave pool 10, together define four separate conduit paths (30, 35, 40, 45) for the water released from the wave making chamber 15. Each of these conduit paths has two ends, and the water entering one end changes its direction upon exiting the other end. The chambers 15 are often made of concrete, and pouring an intricate water conduit would be impossible. Therefore, the water vane 20 may be formed out of metal, plastic, fiberglass, or other rigid material(s) and installed into the chamber 15 after the chamber 15 is built. The water vane 20 may have a mounting bracket 50 to facilitate such an installation. FIG. 4 is an isometric view of the water vane 20 that shows two cross-members 55 that support the three walls 25 of the water vane 20.

Figure 3B:
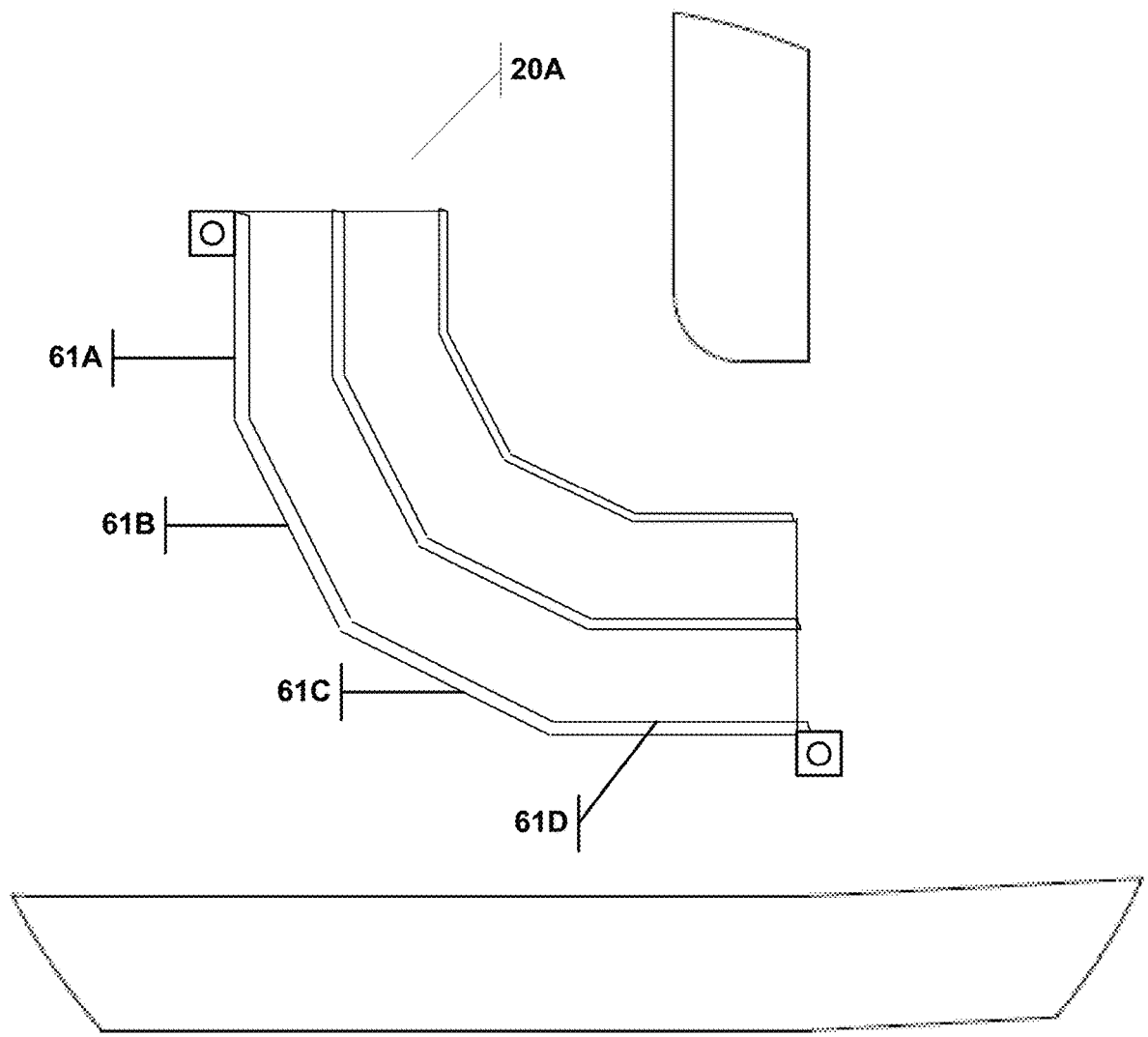
FIG. 3B is another embodiment, where the curve of the water vane is made by small straight sections in successive angles.

FIGS. 3A and 4 also illustrate that the water vane walls 25 are curved-planar—i.e., the curve surface is curved in one dimension and not the other. FIG. 3B, however, is another embodiment where the curve of the water vane 20A is made by small straight sections (61A, 61B, 61C and 61D) in successive angles. This is referred to herein as segmented-curved. More sections may be used to accomplish the required change of direction for the water, but experimentation has shown that four or more straight sections are optimal. As more sections are used, this embodiment begins to approach the curved-planar design that promotes more laminar flow. The segmented-curved embodiment of FIG. 3B, however, may be easier and less expensive to manufacture, install and maintain.

Figure 5A:
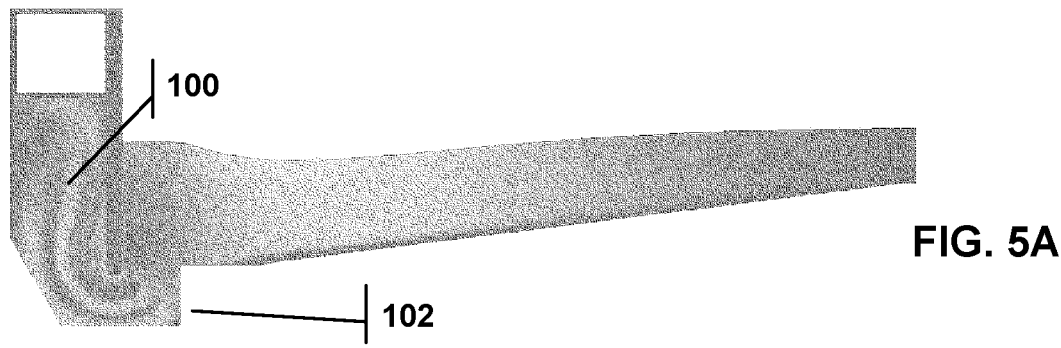
FIG. 5A is a graphical model of the wave formed by the wave making apparatus similar to that of FIG. 1 with the novel water vane.
Figure 5B:
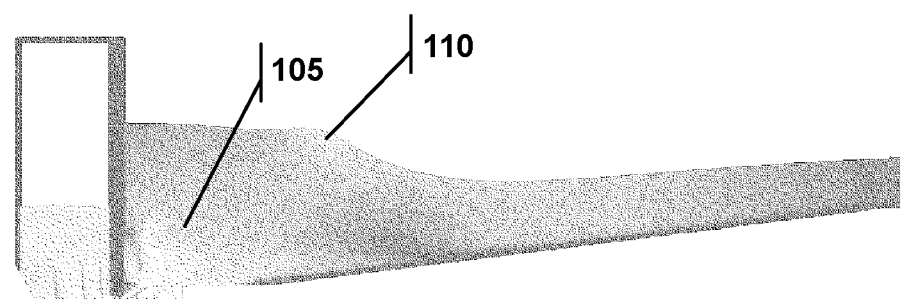
FIG. 5B is a graphical model of the wave formed by the wave making apparatus similar to that of FIG. 1 with the novel water vane, moments after FIG. 5A.
Figure 5C:
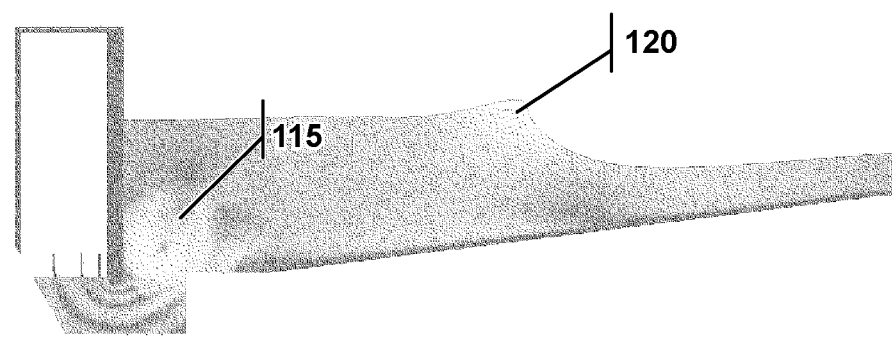
FIG. 5C is a graphical model of the wave formed by the wave making apparatus similar to that of FIG. 1 with the novel water vane, moments after FIG. 5B.
Figure 5D:
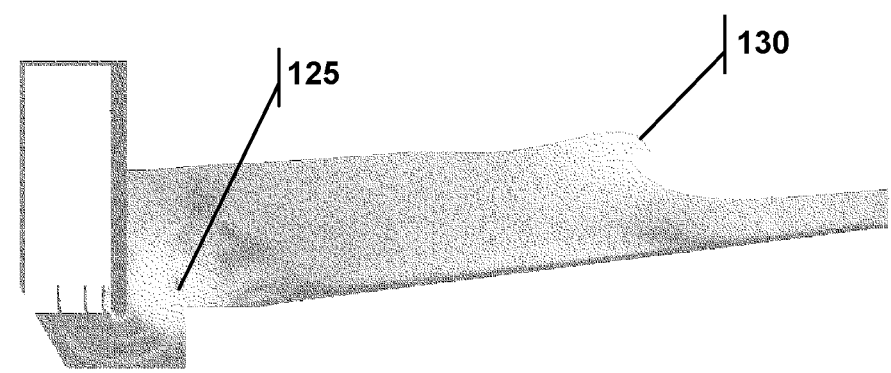
FIG. 5D is a graphical model of the wave formed by the wave making apparatus similar to that of FIG. 1 with the novel water vane, moments after FIG. 5C.
Figure 5E:
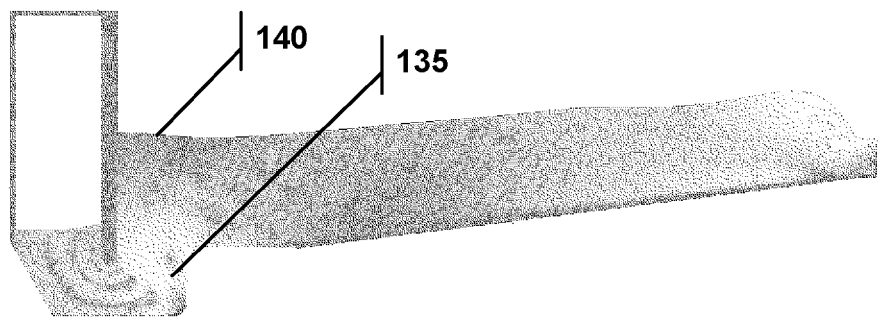
FIG. 5E is a graphical model of the wave formed by the wave making apparatus similar to that of FIG. 1 with the novel water vane, moments after FIG. 5D.
Figure 5F:
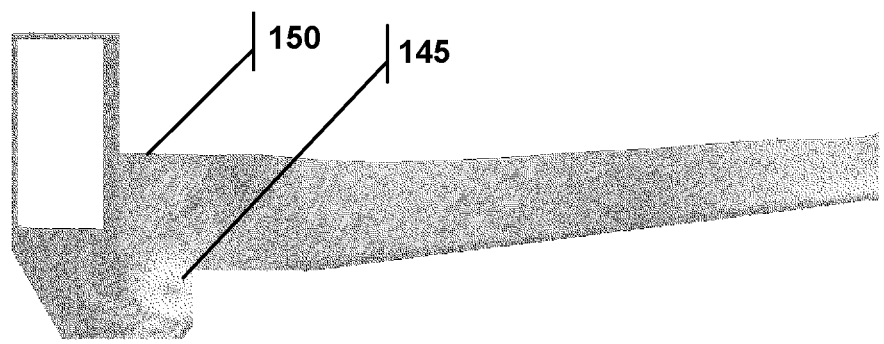
FIG. 5F is a graphical model of the wave formed by the wave making apparatus similar to that of FIG. 1 with the novel water vane, moments after FIG. 5E.
Figure 5G:
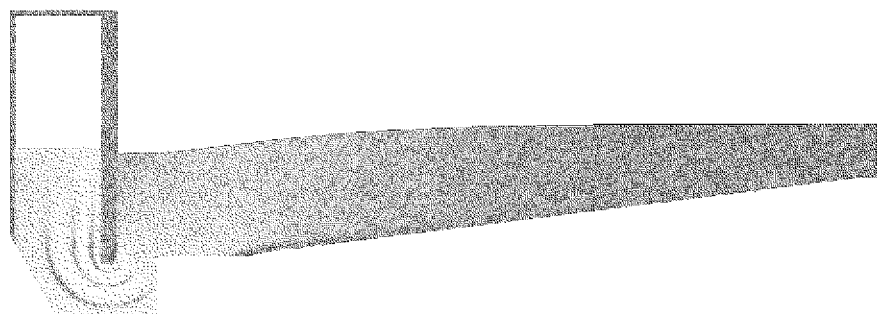
FIG. 5G is a graphical model of the wave formed by the wave making apparatus similar to that of FIG. 1 with the novel water vane, moments after FIG. 5F.
Figure 6:
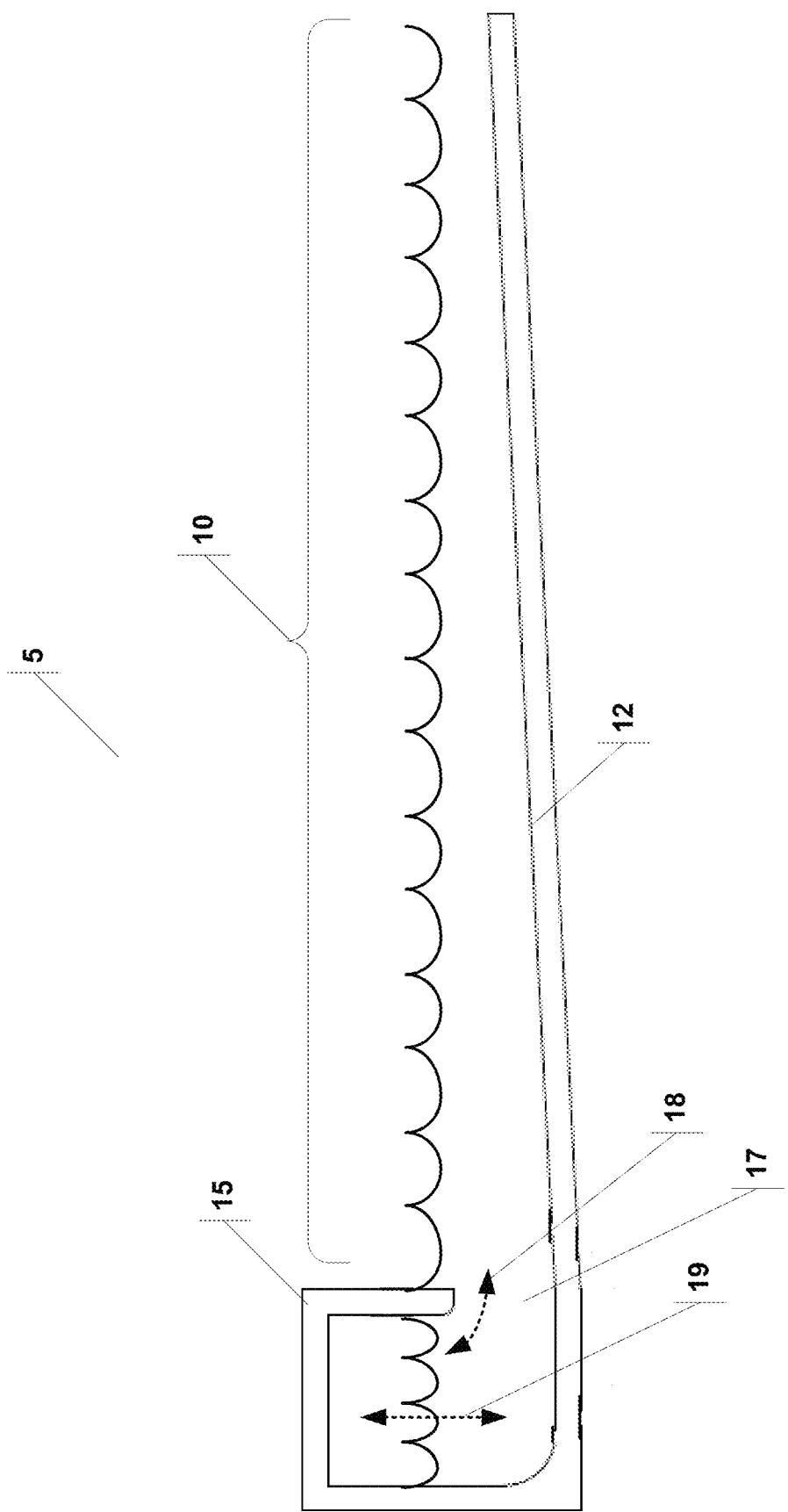
FIG. 6 is a side view of a wave making apparatus, without the novel water vane.
Figure 7A:
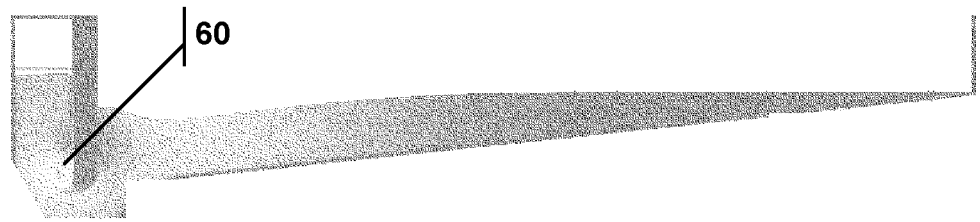
FIG. 7A is a graphical model of the wave formed by the wave making apparatus similar to that of FIG. 6.
Figure 7B:
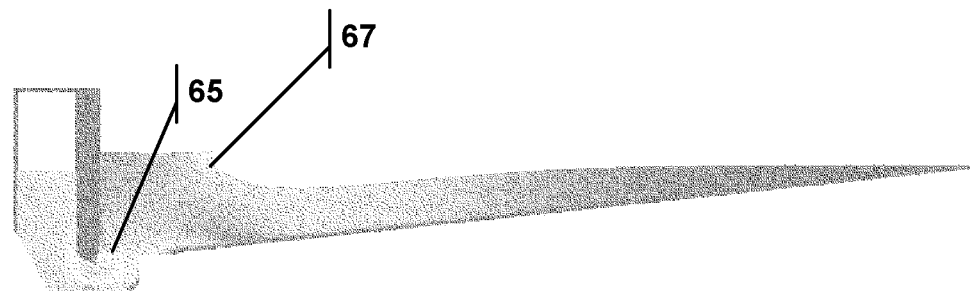
FIG. 7B is a graphical model of the wave formed by the wave making apparatus similar to that of FIG. 6, moments after FIG. 7A.
Figure 7C:
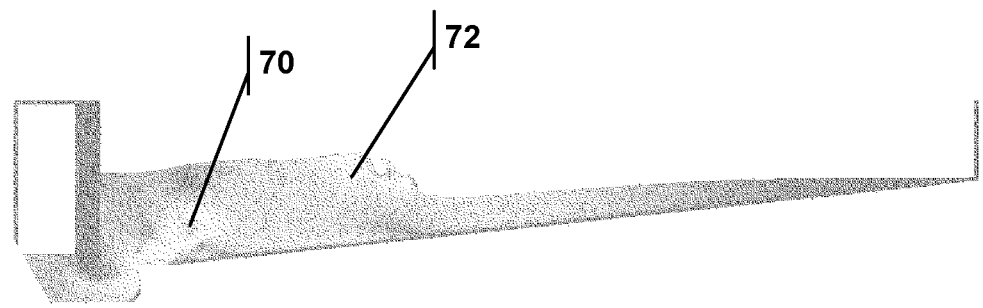
FIG. 7C is a graphical model of the wave formed by the wave making apparatus similar to that of FIG. 6, moments after FIG. 7B.
Figure 7D:
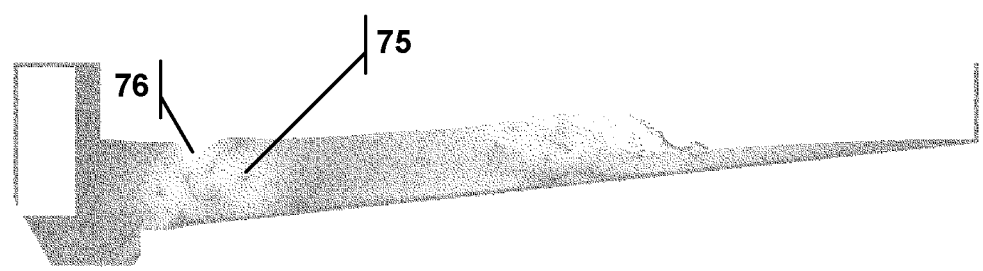
FIG. 7D is a graphical model of the wave formed by the wave making apparatus similar to that of FIG. 6, moments after FIG. 7C.
Figure 7E:
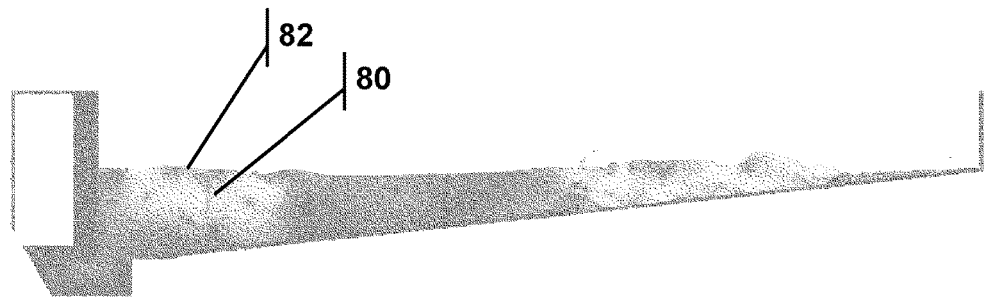
FIG. 7E is a graphical model of the wave formed by the wave making apparatus similar to that of FIG. 6, moments after FIG. 7D.
Figure 7F:
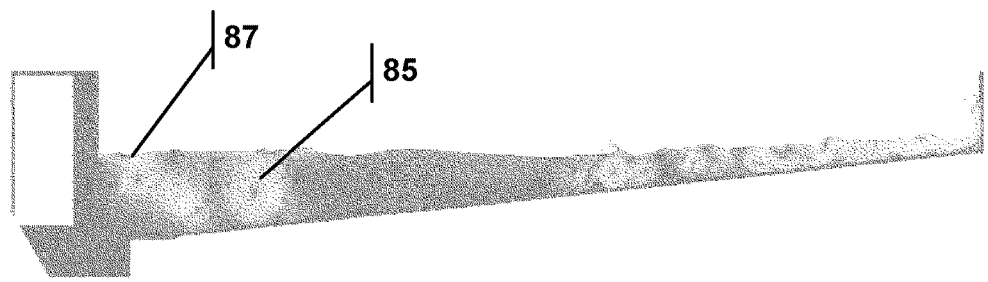
FIG. 7F is a graphical model of the wave formed by the wave making apparatus similar to that of FIG. 6, moments after FIG. 7E.
Figure 7G:
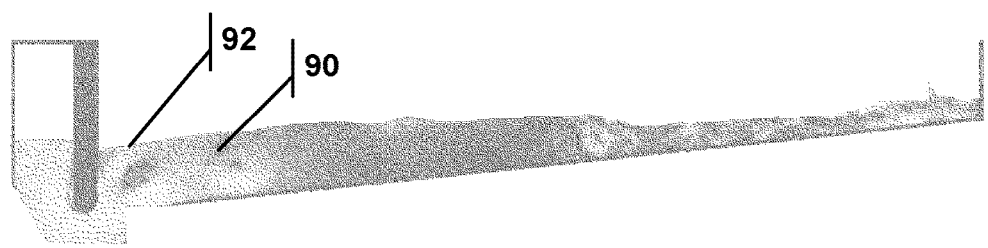
FIG. 7G is a graphical model of the wave formed by the wave making apparatus similar to that of FIG. 6, moments after FIG. 7F.
Figure 7H:
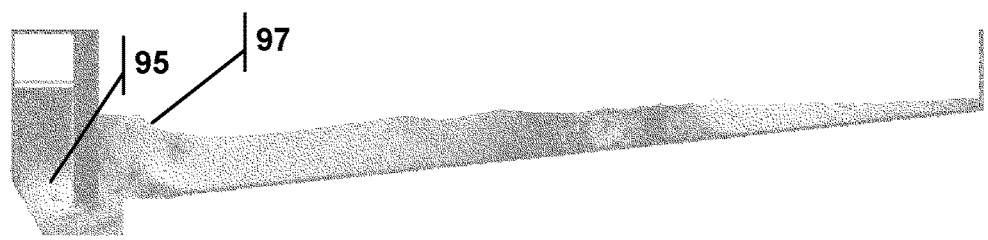
FIG. 7H is a graphical model of the wave formed by the wave making apparatus similar to that of FIG. 6, moments after FIG. 7G.

FIGS. 5A-5G illustrate the currents of the water release and wave formation for a wave main chamber that does have the water vane installed. These figures show one cycle. FIG. 5A is the start of water release from the wave generating chamber into the wave pool. FIG. 5B is moments later, and an eddy is beginning to form (105) in the wave pool, as is the rideable wave 110. In contrast to the chamber without the vane shown in FIGS. 7A and 7B, the vane prevents the formation of an eddy within the chamber and the passageway. In FIG. 5C, the eddy 115 is well-formed, but it remains deep in the wave pool, allowing the surface above the eddy to remain relatively still, thus not eroding the wave 120. In FIG. 5D, the eddy 125 remains deep in the wave pool, and the ridable wave 130 is well-formed and stable. As the water begins to return into the wave generating chamber in FIGS. 5E-5G, the eddy (135, 145) remains deep in the wave pool, and the surface above (140, 150) remains still. Contrast this with the eddy-induced pool surface depressions (76, 82, 87, 92, 97) in the chamber without the vane shown in FIGS. 7D-7H. It is because of the more-placid surface that the operator can actuate the wave generating chamber to generate another wave without delay, or with significantly less delay than the comparable chamber without the water vane.

It should also be noted that in FIGS. 1-4, the water vane 20 is shown with a 90-degree sweep. FIGS. 5A-5G, however, have a vane with a 120-degree because the wave pool bottom has a stepped bottom (see FIG. 5A, arrow 102). Thus, the degree of sweep of the water vane can be increased or decreased to optimize the wave formation. Optimally, the curve will be between 45 and 120 degrees. Further, the water vane 20 can be made of multiple parts, and need not be a single integral structure. Also, the water vane 20 shown in FIGS. 5A-5G extends from the interior of the wave making chamber to the wave pool.

The disclosure herein can be used in a variety of wave making apparatuses, such as those disclosed in U.S. Pat. Nos. 6,629,803; 6,932,541; 7,326,001; 7,658,571; 7,568,859; 7,722,291; 7,815,396; 8,303,213; 8,523,484; 8,622,651; 8,434,966; 8,602,685; 9,068,371; 9,103,133; and 9,279,263. Each of these patents is incorporated by reference herein. The device disclosed herein can be used with a wave making apparatus that releases water from a chamber over a weir, down a chute and into wave pool, such as the one disclosed in U.S. Pat. No. 8,303,213. It can also be used with a wave making apparatus that releases water from a chamber into the bottom of the wave pool, such as the one disclosed in U.S. Pat. No. 7,815,396.

Although exemplary embodiments and applications of the invention have been described herein including as described above and shown in the included example figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A wave making apparatus for use with a wave pool having water and a bottom, and wherein the water creates a water surface in the pool, the apparatus comprising:
   a wave making chamber having an interior and a plurality of chamber walls;
   a passageway connecting the interior to the wave pool and constructed to allow water to flow there-between, wherein the passageway is below the water surface, and wherein the passageway is connected to the wave pool proximate to the bottom;
   a water vane disposed of in or adjacent to the passageway proximate to the bottom, the water vane comprising:
      at least one smooth and curved water vane wall;
      wherein the water vane and the plurality of chamber walls create at least two conduit paths for the water flowing between the interior and the wave pool; and
      wherein the conduit paths have two ends, and the water enters one end in a first direction and exits the second end in a second direction;

wherein the water vane is constructed to mitigate the formation of eddy currents below the water surface as water flows from the chamber to the pool.

2. The wave making apparatus of claim 1, wherein the curved water vane wall has a curve sweep in the range of 45 and 120 degrees.

3. The wave making apparatus of claim 1, wherein the water vane further comprises more than one water vane wall, and the water vane walls create more than two conduit paths.

4. The wave making apparatus of claim 3, wherein the water vane further comprises a cross member connected to the more than one water vane walls.

5. The wave making apparatus of claim 1, wherein the vane extends from the interior to the wave pool.

6. The wave making apparatus of claim 1, the vane further comprising a bracket adapted to mount the water vane to at least one of the plurality of chamber walls.

7. The wave making apparatus of claim 1, wherein the water vane is constructed of multiple parts.

8. The wave making apparatus of claim 1, wherein the water vane wall is curved-planar, segmented-curved, or both.

9. A wave making apparatus for use with a wave pool having water, the apparatus comprising:
 a wave making chamber having an interior and a plurality of chamber walls;
 a passageway connecting the interior to the wave pool and constructed to allow water to flow there between, wherein the passageway is at least partially submerged by the water in the pool;
 a water vane disposed of in or adjacent to the passageway, the water vane comprising:
  at least one smooth and curved water vane wall;
  wherein the water vane and the plurality of chamber walls create at least two conduit paths for the water flowing between the interior and the wave pool; and
  wherein the conduit paths have two ends, and the water enters one end in a first direction and exits the second end in a second direction;
 wherein the water vane is mounted to at least one chamber wall, and the water vane position can be adjusted relative to the at least one chamber wall.

10. The wave making apparatus of claim 9, wherein the adjustment is rotational or translational.

11. The apparatus of claim 9, wherein the water vane is constructed to mitigate the formation of eddy currents within the chamber as water flows from the pool into the chamber.

12. An improvement to a wave making apparatus for use with a wave pool having water and a bottom, and wherein the water creates a water surface in the pool, the apparatus comprising a wave making chamber having an interior and a plurality of chamber walls, and a passageway connecting the interior to the wave pool and constructed to allow water to flow there between, wherein the passageway is below the water surface, and wherein the passageway is connected to the wave pool proximate to the bottom, the improvement comprising:
 a water vane disposed of in or adjacent to the passageway proximate to the bottom, the water vane comprising:
  at least one smooth and curved water vane wall;
  wherein the water vane and the plurality of chamber walls create at least two conduit paths for the water flowing between the interior and the wave pool; and
  wherein the conduit paths have two ends, and the water enters one end in a first directions and exits the second end in a second direction;
 wherein the water vane is constructed to mitigate the formation of eddy currents below the water surface as water flows from the chamber to the pool.

13. The improvement of claim 12, wherein the curved water vane wall has a curve sweep in the range of 45 and 120 degrees.

14. The improvement of claim 12, wherein the water vane further comprises more than one water vane walls, and the water vane walls create more than two conduit paths.

15. The improvement of claim 14, the water vane further comprising a cross member connected to the more than two water vane walls.

16. The improvement of claim 12, wherein the vane extends from the interior to the wave pool.

17. The improvement of claim 12, the vane further comprising a bracket adapted to mount the water vane to at least one of the plurality of chamber walls.

18. The improvement of claim 12, wherein the water vane is constructed of multiple parts.

19. The improvement of claim 12, wherein the water vane wall is curved-planar, segmented-curved or both.

20. An improvement to a wave making apparatus for use with a wave pool having water, the apparatus comprising a wave making chamber having an interior and a plurality of chamber walls, and a passageway connecting the interior to the wave pool and constructed to allow water to flow there-between, wherein the passageway is at least partially submerged by the water in the pool, the improvement comprising:
 a water vane disposed of in or adjacent to the passageway, the vane comprising:
  at least one smooth and curved water vane wall;
  wherein the water vane and the plurality of chamber walls create at least two conduit paths for the water flowing between the interior and the wave pool; and
  wherein the conduit paths have two ends, and the water enters one end in a first directions and exits the second end in a second direction;
 wherein the water vane is mounted to at least one chamber wall, and the water vane position can be adjusted relative to the at least one chamber wall.

21. The improvement of claim 20, wherein the adjustment is rotational or translational.

22. The improvement of claim 20, wherein the water vane is constructed to mitigate the formation of eddy currents within the chamber as water flows from the pool into the chamber.

* * * * *